(12) United States Patent
DeWitt, Jr. et al.

(10) Patent No.: US 7,900,196 B2
(45) Date of Patent: Mar. 1, 2011

(54) METHOD AND APPARATUS FOR MONITORING FOR CONDITIONS DURING EXECUTION OF CODE

(75) Inventors: Jimmie Earl DeWitt, Jr., Georgetown, TX (US); Riaz Y. Hussain, Austin, TX (US); Frank Eliot Levine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1316 days.

(21) Appl. No.: 11/420,068

(22) Filed: May 24, 2006

(65) Prior Publication Data

US 2007/0277157 A1  Nov. 29, 2007

(51) Int. Cl.
*G06F 9/45* (2006.01)
(52) U.S. Cl. .................................... 717/130
(58) Field of Classification Search ............. 717/130
See application file for complete search history.

(56) References Cited

U.S. PATENT DOCUMENTS

| | | | |
|---|---|---|---|
| 6,173,442 B1 * | 1/2001 | Agesen et al. ............. 717/141 |
| 6,593,940 B1 * | 7/2003 | Petersen et al. ............. 715/700 |
| 7,278,057 B2 * | 10/2007 | Betancourt et al. ............. 714/38 |
| 7,624,395 B2 * | 11/2009 | Dostert .......................... 718/1 |
| 2004/0024797 A1 | 2/2004 | Berry et al. |
| 2004/0078691 A1 | 4/2004 | Cirne et al. |
| 2005/0071611 A1 | 3/2005 | DeWitt, Jr. et al. |
| 2005/0155022 A1 | 7/2005 | DeWitt, Jr. et al. |
| 2005/0289307 A1 | 12/2005 | Achanta et al. |

OTHER PUBLICATIONS

Alexander et al., "A unifying approach to performance analysis in the Java environment", IBM Systems Journal, vol. 39, No. 1, 2000, pp. 118-134.

* cited by examiner

*Primary Examiner*—John Chavis
(74) *Attorney, Agent, or Firm*—Yee & Associates, P.C.; David A. Mims, Jr.

(57) ABSTRACT

A computer implemented method, apparatus and computer usable program code for collecting information on wait states occurring during execution of a program. Filter criteria associated with a wait state are identified. A determination is made as to whether the filter criteria are met for the wait state. Information is collected about a set of requesters associated with the wait state in response to a determination that the filter criteria have been met.

19 Claims, 3 Drawing Sheets

METHOD AND APPARATUS FOR MONITORING FOR CONDITIONS DURING EXECUTION OF CODE

BACKGROUND OF THE INVENTION

1. Field of the Invention

The present invention relates generally to an improved data processing system and in particular to a method and apparatus for monitoring the execution of code. Still more particularly, the present invention relates to a computer implemented method, apparatus, and computer usable program code for generating notifications in response to selected conditions occurring during the execution of code.

2. Description of the Related Art

In designing and writing code for applications, one objective is for the application to scale well when more than one processor is used. A complex application, such as, WebSphere™ Application Server, may support may different transactions. It is important that this application be able to take advantage of multiple threads and multiple processors. When the work load increases, an application that scales well should be able to take advantage of multiple processors and have better performance than when only a single processor is available. If the application does not scale well, then the availability of additional processors does not necessarily improve performance. In fact, the availability of additional processors may actually degrade performance.

Currently, determining why an application does not scale is often a very difficult problem. One aspect of understanding the scaling of applications is to determine why a monitor, such as a Java monitor is being held. A monitor is an object with a built-in mutual exclusion and thread synchronization capability. A monitor is used as a mechanism to provide serial access a resource. A monitor, sometimes called a lock, is used by a synchronized Java method. A synchronized Java method is one in which only one thread may use this method at a particular time. Threads that do not have access to the method have to wait until the monitor is released before it can use the method associated with the monitor.

Thus, with the use of a monitor, one particular thread may hold or own a monitor to access a resource. Numerous other threads wait their turn to own the monitor to access the resource when he particular thread releases the monitor. Understanding why the monitor is being held by a thread is often helpful in determining why an application does not scale. The current approach for obtaining information about monitors being held is to generate a call every time a request is made for a monitor. This type of approach is too invasive, because the act of making a call out drastically affects the performance and timing of the system being tested. The profiling code may be much more significant than the code being profiled.

Another aspect of understanding why an application does not scale involves determining why a routine is waiting. A thread may wait for a requested operation or function to be completed. For example, a thread or routine may request data to be read from a storage device. This thread or routine is placed into a waiting mode until the operation to return data is completed. Waiting occurs for any type of input/output (I/O) in these examples. Understanding why routines are waiting also is useful in determining why an application is not scaled.

Currently, this type of information is obtained by generating notifications or calls for all wait and notification mechanisms used in a particular environment. This type of notification also is considered too invasive. Again, the code to make the call out, receive the call out, and make a determination of importance may include much more than just the code that processes the event. This type of perturbation affects the value of the profiling. What is needed is a methodology for being selective in the notifications to minimize the overall invasiveness of the profiling.

SUMMARY OF THE INVENTION

The present invention provides a computer implemented method, apparatus and computer usable program code for collecting information on wait states occurring during execution of a program. Filter criteria associated with a wait state are identified. A determination is made as to whether the filter criteria are met for the wait state. Information is collected about a set of requesters associated with the wait state in response to a determination that the filter criteria have been met.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
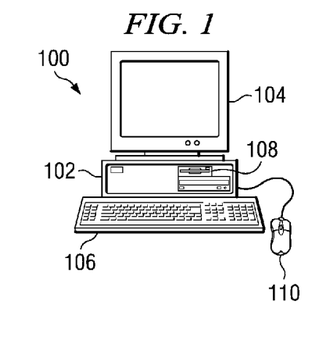
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems, such as a network computer. Computer 100 also preferably includes a graphical user interface (GUI) that may be implemented by means of systems software residing in computer readable media in operation within computer 100.

Figure 2:
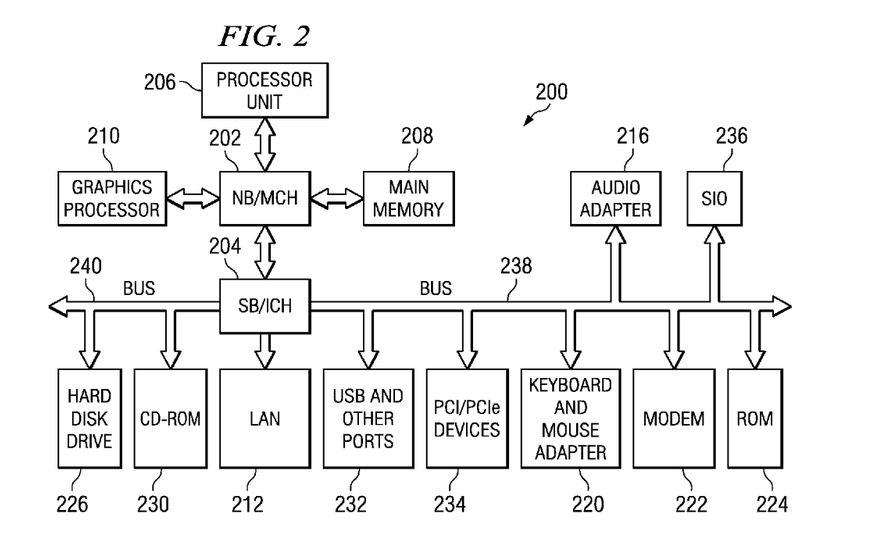
FIG. 2 is a block diagram of a data processing system in which illustrative embodiments may be implemented.

With reference now to FIG. 2, a block diagram of a data processing system is shown in which illustrative embodiments may be implemented. Data processing system 200 is an example of a computer, such as computer 100 in FIG. 1, in which code or instructions implementing the processes of the illustrative embodiments may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide for a computer implemented method, apparatus, and computer usable program code for compiling source code. The methods for the depicted embodiments may be performed in a data processing system, such as data processing system 100 shown in FIG. 1 or data processing system 200 shown in FIG. 2.

Figure 3:
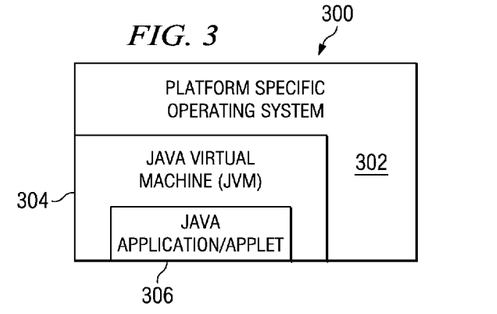
FIG. 3 is a block diagram illustrating the relationship of software components operating within a computer system that may implement the present invention.

With reference now to FIG. 3, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute a Java application or applet 306, which is a program, servlet, or software component written in the Java programming language. The computer system in which JVM 304 operates may be similar to data processing system 200 in FIG. 2 or computer 100 in FIG. 1 described above. However, JVM 304 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs may not be run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte codes may be translated into native code by a just-in-time compiler or JIT.

A JVM loads class files and executes the bytecodes within them. The class files are loaded by a class loader in the JVM. The class loader loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

The illustrative embodiments provide a computer implemented method, apparatus, and computer usable program code for collecting information on wait states occurring during execution of a program. In the illustrative embodiments, filter criteria are identified in which the criteria identified are associated with a wait state. A determination is made as to whether the filtering criteria are met when a set of requesters is in a wait state. This set of requesters may be one or more requesters, depending on the particular implementation. Information about a requester in this set of requesters is collected in response to determining that the filter criteria have been met.

In these examples, a wait state is a state in which a set of one or more requesters are waiting for some event to occur. This event may be, for example, waiting for ownership of a monitor to access a resource controlled or associated with a monitor. In these examples, the resource is a method that is accessed by the requester. The wait state also may occur, for example, when a set of one or more requesters is waiting for an operation to occur or complete. The operation in these examples is the completion of an input/output (I/O) request.

Figure 4:
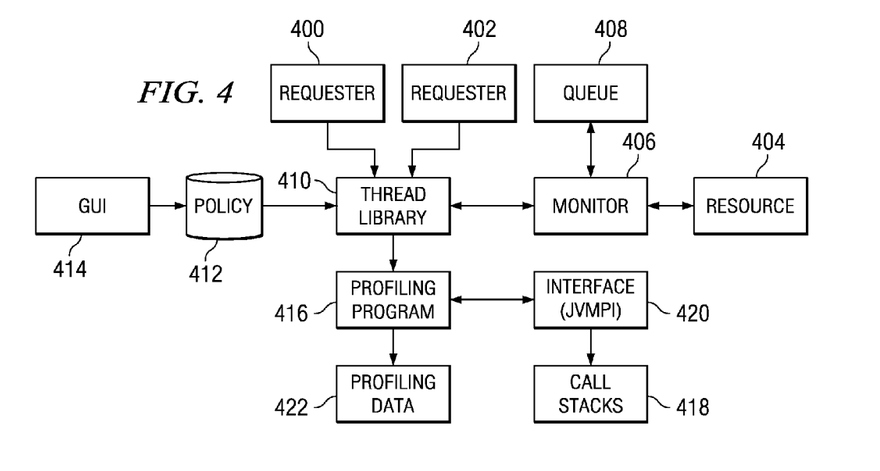
FIG. 4 is a diagram illustrating components used to collect information from a monitor in accordance with an illustrative embodiment.

Turning now to FIG. 4, a diagram illustrating components used to collect information from a monitor in accordance with an illustrative embodiment. In these examples, requesters 400 and 402 request access to resource 404. Resource 404 is associated with monitor 406. In this example, requesters 400 and 402 take the form of threads and resource 404 is a method accessed through monitor 406. Requests include any operation or service that is not being performed synchronously, such as, a database query or a credit card verification request. These services may be on the same machine or on a different machine. In a Java Virtual Machine (JVM), thread library 410 is the component that schedules the thread that is waiting on a service. In an operating system, the operating system itself, typically the scheduler, handles the dispatching of the threads that are waiting on a service.

Monitor 406 provides serial access to resource 404. In other words, monitor 406 only allows one requester to use resource 404 at a particular time. For example, if requester 400 requests access to resource 404, monitor 406 provides that access if no other requester is currently using resource 404. In this case, requester 400 is said to "own" monitor 406. Thus, if requester 402 requests access to resource 404, monitor 406 does not allow access. Requester 402 is called a "contending" requester. In other words, monitor 406 locks resource 404 for use by requester 400.

When requester 400 releases resource 404, monitor 406 then allows requester 402 to take ownership of monitor 406 to access resource 404. Monitor 406 may maintain a list of requesters waiting to access resource 404 in queue 408. Selecting which requester should own a monitor from a group of contended requesters may be performed using any type of priority or selection scheme desired. For example, a first-in-first-out priority scheme may be employed.

In these examples, the requests are sent to monitor 406 through thread library 410. Thread library 410 is a component in a Java Virtual Machine that works with threads executing in the environment. This particular component provides functions, such as scheduling, locking infrastructure, placing threads in a wait state that wait for resources, and other functions involving threads.

The illustrative embodiments include processes in thread library 410 that are used to identify the presence of a wait state and filter criteria associated with the wait state. This filter criteria is used to determine whether a set of one or more requesters in a wait state meet the filter criteria. When these criteria are met, information about one or more of the requesters in the set of requesters is collected. In this particular example, an ability to identify specific monitors or locks for call outs or other actions is provided in thread library 410. Thread library 410 allows for monitors of interest to be selected for call outs or other actions.

The selection of monitors may be made through user input stored in policy 412. In these examples, policy 412 is a set of rules and data used to determine when to collect data when a wait state is present. In addition to identifying monitors of interest, policy 412 also includes filter criteria that are to be met before an action is taken. Policy 412 also may define what type of data is to be collected and from what requesters or processes associated with the wait states. In this example, requester 400 and requester 402 are associated with the wait state. Requester 400 owns monitor 406 and uses resource 404, while requester 402 is a contended requester waiting to obtain ownership of monitor 406.

These criteria may be defined through user input. These filter criteria may take various forms. For example, thresholds may be used to specify the minimum number of contended threads before taking action. Alternatively, the threshold may identify a maximum number contended requesters after which no further notifications are made. These contended threads are requesters waiting to access resource 404 in these examples. In this example, monitor 406 is the monitor selected for sampling of call outs.

Another example of filter criteria that may be specified includes selecting by thread name, thread group, or monitor identifiers. In this manner, if a particular thread, having a selected name that is stored in policy 412, is waiting for access to resource 404, an action such as a call out may be made. A call out is a call that is made to a program, such as profiling program 416. Additionally, if the thread having the selected name in policy 412 is using the particular resource, a call out also may be made. The specified criteria may include other occurrence thresholds, such as generating a call every ten times monitor 406 is requested.

The criteria contained within policy 412 may be selected or designated by a user through graphical user interface (GUI) 414 in these examples. Graphical user interface 414 also may provide a presentation of information relating to the code being executed to facilitate the selection of filter criteria.

For example, GUI 414 may present displays of threads that are being executed. From this display, a user may select one or more threads to form filter criteria as described above. As another alternative, GUI 414 may display monitors that are present for the execution of the code. From this display, the user may select one or more monitors as monitors of interest for which data is to be collected when different criteria are met.

Additionally, GUI 414 also may display actual code lines or modules or sections within the code being executed to allow the user to select portions of the code to form filter criteria. GUI 414 also may display areas of the code in which execution is occurring, as well as information as to how often particular portions of code are executed to allow the user to select portions of code for monitoring.

In these examples, when the filter criteria are met, an action is initiated or taken. More specifically, thread library 410 generates a call to profiling program 416. This call may identify the requester currently using resource 404 as well as the current requester or all requesters that are waiting to use resource 404. With this information, profiling program 416 may collect information, such as call stacks 418, using interface 420. A call stack is a list of frames in which the first frame is the top-most frame in the stack. In these examples, each frame typically contains the method (jmethodID) identification of the method entered and possibly the byte code, if being executed interpretively. Additional information may be available, such as, a program counter and a byte coded body method, a table associating variable names with values, a stack and a synchronization flag indicating whether the method currently executing is synchronized. A call stack identifying each method called for the waiting threads may be recorded in a tree in which the tree indicates the number of occurrences of this particular stack. This indication is made in these examples by incrementing a counter at the leaf node of the stack.

In these examples, interface 420 is a Java Virtual Machine Tools Interface (JVMTI). This interface allows for the collection of call stack information. Call stacks 418 may be, for example, standard trees containing count usage for different threads or methods. Alternatively, call stacks 420 may be separate stacks and include timestamps that are useful for monitor analysis.

Further, arcflow reports also may be generated on selected monitors and conditions in this sampling. Arcflow is a model for recording and reporting resource consumption for a broad range of performance data and analysis questions. The resources include, for example, interpreter cycles, heap objects allocated, heap byte allocated, JITed code instructions executed, and objects of different classes. These and other resources of interest may be used by consumers, such as for example, a thread, an object, an interpreted method, a system call, and a JITed method. Arcflow collects performance data, which may be, for example, sampled data, counter data, or some other type of data of interest. This collected data is stored in a trace file and reports are generated from the trace file. This model is used to capture the relationships between consumers and resources.

An arcflow report may include information identifying performance data, such as the number of occurrences or calls made and the resource consumption or processor time taken. This type of information is associated with the consumer or object requesting the particular resource. In these examples, the consumer is the method. Arcflow reports also may include other information, such as a percentage of the total consumption time rather than what is actually used by the particular consumer.

When this information is collected by profiling program 416, the information is stored as profiling data 422 for analysis. Profiling program 416 may generate arcflow reports for analysis. In particular, this analysis may yield results that allow a better understanding as to why a program does not scale well.

In these examples, the selected action is a call to profiling program 416. Of course, other actions may be taken depending on the particular implementation. For example, thread library 410 may directly retrieve call stacks 418 rather than calling profiling program 416. By collecting statistics, such as, the typical wait time for a specific service, thread library 410 may adjust its scheduling algorithm to check for rescheduling only after some minimum time has occurred. When the call out occurs, due to a notification, there should also be support for a reason code to identify the cause of the notification. In these examples, reason codes are used. Reason codes could include, for example, timeout or disk I/O completed. This information could allow for the collection of statistics to help with the identification of patterns. With this information, profiling program 416 may collect information, such as call stacks 418, using interface 420. For example, if the application is trying to monitor traffic patterns as a function of day/time to adjust traffic light changes where sensors detect specific conditions, collecting the posting reason data could allow for better understanding of why there are flow problems. Further, the depth of a thread's call stack may be used as additional criteria for making the call out.

Profiling program 416 identifies where a program spends time during execution. This type of information may be used to discover how a program uses memory, what types of objects are used, and how many objects are used.

In these examples, the processes used to select monitors for sampling as well as the criteria needed to trigger the sampling are implemented within thread library 410. Of course, these processes could be implemented in other components in addition to or in place of thread library 410.

Figure 5:
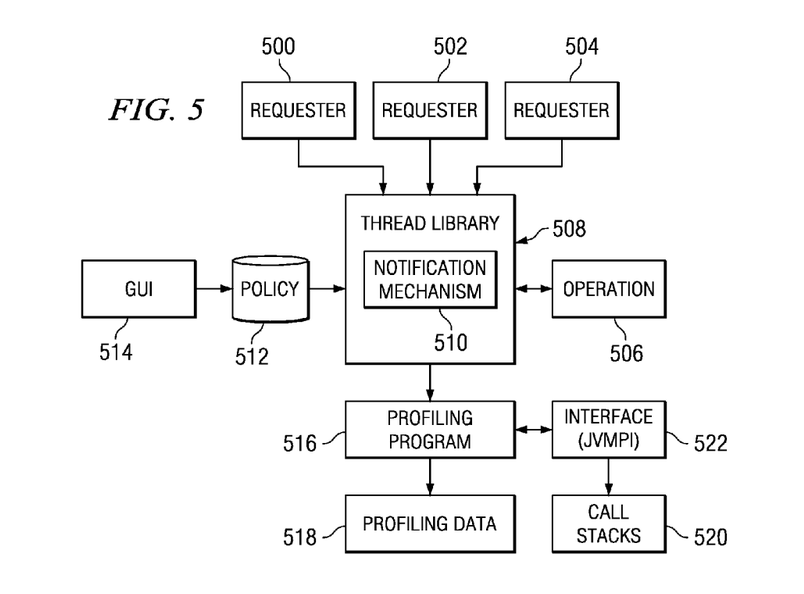
FIG. 5 is a diagram illustrating components in generating an action in response to criteria being met while one or more requesters are waiting for a notification in accordance with an illustrative embodiment.

Another example of comparing filter criteria to a wait state involves requesters that have requested an operation, such as an I/O operation. Turning now to FIG. 5, a diagram illustrating components in generating an action in response to criteria being met while one or more requesters are waiting for a notification is depicted in accordance with an illustrative embodiment. In this example, one or more of requesters 500, 502, and 504 have requested operation 506 to be performed through thread library 508. In these examples, operation 506 is an I/O operation, such as a request to read data from disk.

Notification mechanism 510 in thread library 508 is used to notify requesters 500, 502, and 504 when operation 506 has completed. Although these examples show requesters 500, 502, and 504 requesting the same operation, the embodiments may be applied to different operations. Further, any operation may be used in the illustrative embodiments. Notification mechanism 510 notifies a requester, such as requester 500 that operation 506 has completed.

Notification mechanism 510, in these examples, includes a lock with a work area for waiting routines. The work area includes information on the status, owner, number of requests, a semaphore, and other information. Notification mechanism 510 monitors waiting requesters. In particular, notification mechanism 510 looks at a semaphore status to see if waiting requesters are present. A semaphore is a protected variable, or abstract data type, and constitutes the classic method for restricting access to shared resources, for example, storage, in a multiprogramming environment. An implementation of a semaphore could allow for a mechanism to indicate a status of some activity and could take the form a shared space or variable to allow for inter-process communications. In these examples, the semaphore should be considered a shared memory area that includes or has a pointer to information regarding the criteria for making a callout or for performing an operation related to the semaphore.

Additionally, in these examples, notification mechanism 510 is a component in which the processes of the illustrative embodiments may be implemented. Of course, these processes may be implemented in other components in place or in addition to notification mechanism 510. In this particular example of an illustrative embodiment, notification mechanism 510 also determines when an action will be initiated for wait state for a set of one or more requesters waiting for an operation to complete. In these examples, notification mechanism 510 is a new mechanism that is used to notify or initiate an action.

In this embodiment, notification mechanism 510 uses policy 512 to initiate the action. Policy 512 contains the filter criteria used to determine when and what actions to take in these examples. Additionally, policy 512 may specify what operations are the ones for which information will be collected in addition to when or under what conditions information will be collected. The identification of the filter criteria is stored within policy 512 in these examples. In an illustrative embodiment, when a semaphore is initialized, a determination is made using policy 512 as to whether the semaphore is a selected semaphore for additional monitoring. If the semaphore is identified for additional monitoring, then an additional semaphore work area is allocated to contain the selection criteria. When the semaphore is owned or requested, a determination is made whether there are any additional criteria to be applied. In an alternative embodiment, a simple flag or pointer may be used to point to the specific policy related to the specific semaphore.

These filter criteria may include, for example, thresholds that specify the minimum number of waiting threads before activating notification mechanism 510 for contended requesters. Also, there may be specified a maximum number of contended requesters, which when met, indicate that no further processing takes place until the number of waiting threads is below the specified maximum. This maximum restriction is especially helpful, when there is a call out that identifies all the requesters. In another example, a call out is made when the number of requesters exceeds a previous maximum by a specified granularity. For example, a call out is made or an operation is performed when number of waiting threads is 10 or has increased by 10.

Additionally, policy 512 may include identification by thread name, thread group, or some other identifier as to when notification mechanism 510 is to be activated. In addition, time thresholds between start-wait-notify events generated by thread library 508, also may be used to determine when notification mechanism 510 is to be activated.

In these examples, GUI 514 may be used to present information to the user and allow the user to select filter criteria described above.

When the filter criteria stored in policy 512 are met, notification mechanism 510 performs a selected action, such as generating a call to profiling program 516. Other actions include, for example, collecting one or more call stacks to identify the calling sequence for the criteria for the sequence that has been met.

In these examples, profiling program 516 collects data and stores this data as profiling data 518 for later use. In this depicted example, thread library 508 generates a call out to profiling program 516 that includes the notifying thread and notified threads to allow profiling program 516 to collect information, such as call stacks 520 through interface 522. In these illustrative embodiments, interface 522 is a Java Virtual Machine Profiling Interface (JVMPI) or a Java Virtual Machine Tools Interface (JVMTI). Call stacks 520 may take the form of standard trees with count usage or may be separate stacks that include timestamps for monitor analysis.

Additionally, when a call out is generated, a reason code may be added to identify the cause of the notification. The reason code would be generated by the threading component, using policy 512. Thread library 508 would typically determine if the operation did not occur in a specified time. This determination is usually performed by specifying a timeout on the semaphore request. The call out to the profiler would typically be performed by a separate component such as the JVMTI component.

Alternatively, another component, including a native operating system, may have generated the reason code. Thread library 508 would need to pass on or translate the reason code generated by the component that detected the condition. These reason codes may include, for example, a timeout has occurred, disk I/O has been completed, or a disk write has completed. Whether a monitor is one selected for monitoring is determined using a policy, such as policy 512. This type of information may be used with the collection of statistics to identify patterns of operations. For example, if an application monitoring for traffic patterns as a function of day/time may adjust traffic light changes or sensors to detect specific conditions. The collection of reason codes may allow for a better understanding of why flow problems may occur for this system.

Figure 6:
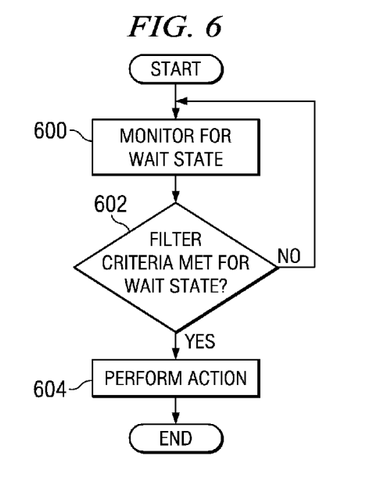
FIG. 6 is a flowchart of a process for monitoring for a wait state in accordance with an illustrative embodiment.

Turning now to FIG. 6, a flowchart of a process for monitoring for a wait state is depicted in accordance with an illustrative embodiment. In this particular example, the wait state is one that occurs when waiting for access to the resource or waiting for an operation to complete. The process illustrated in FIG. 6 may be implemented in a component, such as thread library 410 in FIG. 4.

The process begins by monitoring for a wait state (step 600). In this example, the wait state may be any state in which a set of one or more requesters are waiting. For example, the requesters may be waiting for access to the resource through a monitor or for an operation to complete. A determination is made as to whether the filter criteria are met for the wait state (step 602). This filter criteria may simply be a determination that known selection criteria is specified and no further action is required. One illustrative implementation uses a flag or pointer in the semaphore itself to indicate if any criteria are present to check. If the filter criteria are met in step 602, the process performs an action (step 604) with the process terminating thereafter. If the process determines the criteria were not met or no criteria specified in step 602, the process returns to step 600 to monitor for a wait state.

Figure 7:
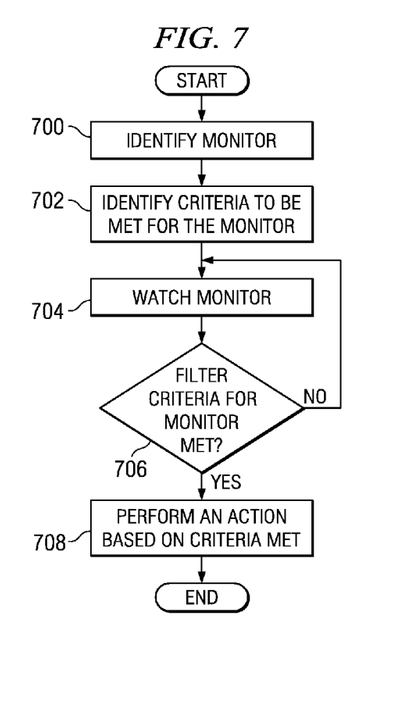
FIG. 7 is a flowchart of a process for generating an action in response to filter criteria being met for a wait state in accordance with an illustrative embodiment.

Turning now to FIG. 7, a flowchart of a process for generating an action in response to filter criteria being met for a wait state is depicted in accordance with an illustrative embodiment. The process illustrated in FIG. 7 may be implemented in a component such as thread library 410 in FIG. 4.

The process begins by identifying a monitor (step 700). Whether a monitor is one selected for monitoring is determined using a policy, such as policy 412 in FIG. 4. Then the process identifies filter criteria to be met for the monitor (step 702) and watches the monitor (step 704). In this example, the filter criteria are obtained by the thread library from a policy, such as policy 412 in FIG. 4. A determination is made as to whether the filter criteria are met for the wait state (step 706). In step 706, the wait state occurs with the presence of one or more requesters waiting for access to the monitor. If the filter criteria are met in step 706, the process performs an action based on the criteria met (step 708) with the process terminating thereafter.

In this particular example, the action is one such as a call to a profiling program when certain criteria are met with respect to a monitor of interest. If the process determines the filter criteria were not met in step 706, the process returns to step 704 to watch the monitor.

Figure 8:
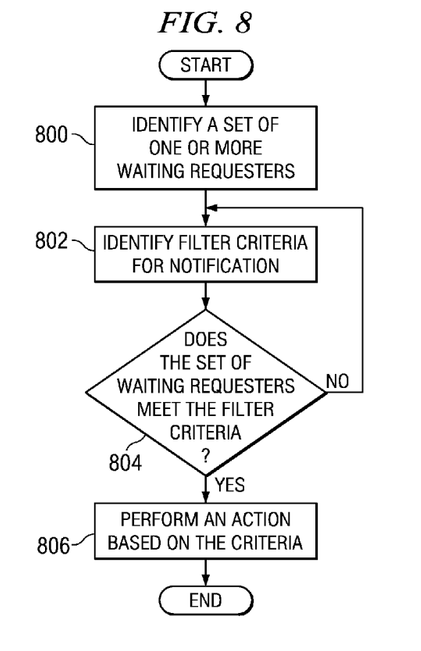
FIG. 8 is a flowchart of a process for initiating an action when filter criteria are met during a wait state in accordance with an illustrative embodiment.

Turning now to FIG. 8, a flowchart of a process for initiating an action when filter criteria are met during a wait state is depicted in accordance with an illustrative embodiment. The process illustrated in FIG. 8 may be implemented in a component such as thread library 508 in FIG. 5.

The process begins by identifying a set of one or more waiting requesters (step 800). The requesters are processes or routines that have requested an input/output (I/O) operation in these examples. The requesters wait until the I/O operation has completed. These requesters are notified by a notification mechanism, such as notification mechanism 510 in FIG. 5, when the operation has completed.

Then the process identifies filter criteria for notification (step 802). These filter criteria may be, for example, 10 requesters are present or a timeout period has passed. The process then determines if the set of waiting requesters meet the filter criteria (step 804). If the waiting resources meet the filter criteria in step 804, the process performs an action based on those criteria (step 806) with the process terminating thereafter.

Turning back to the determination made in step 804, if the waiting resources do not meet the filter criteria, the process returns to step 802 and continues to identify filter criteria for notification.

Figure 9:
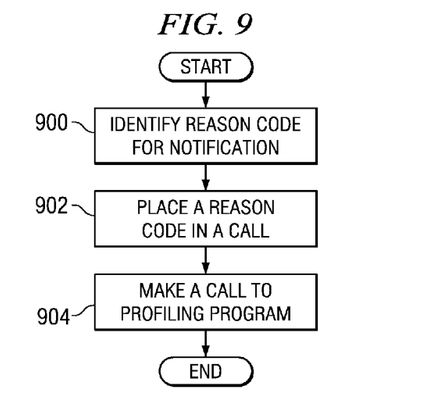
FIG. 9 is a flowchart of a process for generating a call with a reason code in accordance with an illustrative embodiment.

Next, FIG. 9 is a flowchart of a process for generating a call out with a reason code in accordance with an illustrative embodiment. The process in FIG. 9 is a more detailed description of step 806 in FIG. 8.

The process begins by identifying a reason code for notification (step 900). In the illustrative embodiments, the reason code takes a form or format that is usable by the program that is called. The process then places the reason code in a call (step 902). Finally, a call is made to a profiling program (step 904), with the process terminating thereafter.

Thus, the illustrative embodiments provide a computer implemented method, apparatus, and computer usable program code for collecting information relating to requesters in a wait state. Filter criteria associated with a wait state are identified. A determination is made as to whether the wait state is met when a set of requesters is in the wait state. In response to the filter criteria being met, information about one or more requesters is collected. This information may be used to identify reasons as to why the different wait states are occurring.

Although the depicted examples for the illustrative embodiments are described with respect to a Java Virtual Machine, the embodiments may be implemented in other types of environments other than a Java Virtual Machine. For example, the embodiments may be implemented in any virtual machine or in an operating system. The embodiments of the present invention may be implemented in any environment in which wait states are present. For example, the described features for the illustrative embodiments may be applied to other constructs or locking mechanisms other than a monitor. The different features may be applied to requesters waiting for operations to complete in any operating environment.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of collecting information on wait states occurring during execution of a program, the computer implemented method comprising:
   obtaining filter criteria associated with a wait state, wherein the filter criteria comprises a threshold specifying a minimum number of requesters;
   determining whether the threshold of the minimum number of requesters in the filter criteria is met for the wait state;
   responsive to a determination that the threshold has been met, identifying a reason code for the wait state; and
   sending a call to a profiling program with the identified reason code for the wait state, wherein the profiling program collects information about a set of requesters associated with the wait state.

2. The computer implemented method of claim 1, wherein the wait state is for a monitor.

3. The computer implemented method of claim 2, wherein the set of requesters comprises at least one of a first requester having the monitor and a second requester waiting for the monitor.

4. The computer implemented method of claim 3, wherein the profiling program collects the information by:
   identifying the set of requesters to form an identification; and
   sending the call to the profiling program with the identification, wherein the profiling program uses the identification to collect call stack information for the set of requesters.

5. The computer implemented method of claim 4, wherein the identification comprises a thread group identifier.

6. The computer implemented method of claim 1, wherein the wait state is for an operation being performed for the requester.

7. The computer implemented method of claim 6, wherein the operation is an input/output operation.

8. The computer implemented method of claim 1, wherein the obtaining, determining, identifying, and sending steps are implemented in a thread library in one of a virtual machine or an operating system.

9. The computer implemented method of claim 1 further comprising:
   receiving a selection of filter criteria through user input to a graphical user interface.

10. The computer implemented method of claim 1, wherein the requester is a thread.

11. The computer implemented method of claim 1, wherein the filter criteria comprises a second threshold specifying a maximum number of requesters for the wait state, and wherein no further calls to the profiling program are generated in response to a determination that the second threshold has been met for the wait state until the number of requesters falls below the second threshold.

12. A data processing system comprising:
   a bus;
   a storage device connected to the bus, wherein the storage device includes computer usable program code; and
   a processor unit connected to the bus, wherein the processor unit executes computer usable program code to obtain filter criteria associated with a wait state, wherein the filter criteria comprises a threshold specifying a minimum number of requesters; determine whether the threshold of the minimum number of requesters in the filter criteria is met for the wait state; identify a reason code for the wait state in response to a determination that the threshold has been met; and send a call to a profiling program with the identified reason code for the wait state, wherein the profiling program collects information about a set of requesters associated with the wait state.

13. A computer program product comprising:
   a non-transitory computer readable storage medium having computer usable program code for collecting information on wait states occurring during execution of a program stored thereon, the computer readable storage medium comprising:
   computer usable program code for obtaining filter criteria associated with a wait state, wherein the filter criteria comprises a threshold specifying a minimum number of requesters;
   computer usable program code for determining whether the threshold specifying a minimum number of requesters in the filter criteria is met for the wait state;
   computer usable program code for identifying a reason code for the wait state in response to a determination that the threshold has been met; and
   computer usable program code for sending a call to a profiling program with the identified reason code for the wait state to collect information about a set of requesters associated with the wait state.

14. The computer program product of claim 13, wherein the wait state is for a monitor.

15. The computer program product of claim 14, wherein the set of requesters comprises at least one of a first requester having the monitor and a second requester waiting for the monitor.

16. The computer program product of claim 15, wherein the computer usable program code collects information about a set of requesters associated with the wait state by:
   computer usable program code for identifying the set of requesters to form an identification; and
   computer usable program code for sending the call to the profiling program with the identification, wherein the profiling program uses the identification to collect call stack information for the set of requesters.

17. The computer program product of claim 13, wherein the wait state is for an operation being performed for the requester.

18. The computer program product of claim 17, wherein the operation is an input/output operation.

19. The computer program product of claim 13, wherein the computer usable program code for obtaining filter criteria associated with a wait state, determining whether the threshold specifying a minimum number of requesters in the filter criteria is met for the wait state, identifying a reason code for the wait state in response to a determination that the threshold has been met, and sending a call to a profiling program with the identified reason code for the wait state to collect information about a set of requesters associated with the wait state are implemented in a thread library in one of a virtual machine or an operating system.

* * * * *